United States Patent [19]

Schwerzel et al.

[11] Patent Number: 5,051,160
[45] Date of Patent: Sep. 24, 1991

[54] POLYMERIC REACTION PRODUCT THAT BECOMES WATER-THINNABLE ON PROTONATION WITH AN ACID

[75] Inventors: Thomas Schwerzel, Meckenheim; Hans Schupp, Worms, both of Fed. Rep. of Germany

[73] Assignee: BASF Lacke & Farben Aktiengesellschaft, Münster, Fed. Rep. of Germany

[21] Appl. No.: 476,882

[22] Filed: Feb. 8, 1990

[30] Foreign Application Priority Data

Feb. 28, 1989 [DE] Fed. Rep. of Germany ....... 3906144

[51] Int. Cl.[5] .................... C25D 13/06; C08L 63/02; C08L 9/02
[52] U.S. Cl. ............................. 204/181.4; 204/181.7; 523/402; 523/413; 525/113; 525/122
[58] Field of Search ....................... 525/113; 524/901; 523/423, 402; 204/181.7, 181.4

[56] References Cited

U.S. PATENT DOCUMENTS

| | | | |
|---|---|---|---|
| 3,823,107 | 7/1974 | Cotton | 268/23.7 X |
| 4,253,930 | 3/1981 | Tsuchiya et al. | 204/181.7 |
| 4,432,850 | 2/1984 | Moriarity et al. | 204/181 |
| 4,769,420 | 9/1988 | Schwerzel et al. | 525/113 |
| 4,871,808 | 10/1989 | Schwerzel et al. | 525/113 |
| 4,871,882 | 10/1989 | Schwerzel et al. | 525/113 |

FOREIGN PATENT DOCUMENTS 0253404 1/1988 European Pat. Off. .
3639570 6/1988 Fed. Rep. of Germany .
87/02686 5/1987 World Int. Prop. O. .

*Primary Examiner*—John F. Niebling
*Assistant Examiner*—Kishor Mayekar
*Attorney, Agent, or Firm*—Keil & Weinkauf

[57] ABSTRACT

Polymeric reaction products which become water-thinnable on protonation with an acid and are suitable for use in the form of aqueous dispersions as additives in electrocoating baths are formed from A. a butadiene/acrylonitrile copolymer which contains primary and/or secondary amino groups and B. an epoxy compound having an average molecular weight of from 140 to 10,000 and containing on average from 1.5 to 3 epoxy groups per molecule, the amount of (A) being such that 1.05 moles or more of primary and/or secondary amino groups of component (A) are present per mole of epoxy groups of component (B).

8 Claims, No Drawings

POLYMERIC REACTION PRODUCT THAT BECOMES WATER-THINNABLE ON PROTONATION WITH AN ACID

The present invention relates to a polymeric reaction product that becomes water-thinnable on protonation with an acid and is formed from A. a butadiene/acrylonitrile copolymer which contains primary and/or secondary amino groups, and
B. an epoxy resin having an average molecular weight of 140–10,000 and containing on average 1.5–2.5 epoxy groups per molecule, the amount of (A) being such that 1.05 moles or more of primary and/or secondary amino groups of component (A) are present per mole of epoxy groups of component (B).

The present invention further relates to a process for preparing the polymeric reaction product according to the present invention, to an aqueous dispersion containing said reaction product, and to the use of said aqueous dispersion in an electrocoating bath.

US-A-4 432 850 describes reaction products of polyepoxies with polyoxyalkylenepolyamines which, following protonation and dispersion in water, can be used as additives in standard electrocoating baths where they are said to improve the flow and flexibility of coatings.

EP-A-253 404 likewise concerns aqueous dispersions which can be added to standard electrocoating baths. These dispersions contain reaction products of diglycidyl ethers of polyols or aromatic diols and a mono- or bifunctional phenol whose remaining epoxy groups are wholly or partly converted into cationic groups. This produces thick coatings having improved corrosion protection properties.

Furthermore, DE-A-3 639 570 describes binders for electrocoating baths, obtained by reacting amine-terminated butadiene/acrylonitrile copolymers with partially deactivated epoxy resins.

Cathodic electrocoats should combine the following essential properties:
good corrosion protection
good elasticity.

Prior art systems frequently possess only one of the two properties; that is, coatings which provide good corrosion protection are inelastic, while elastic coatings have poor corrosion protection properties.

It is an object of the present invention to provide a system which meets both of these criteria.

We have found that this object is achieved by the polymeric reaction product defined at the beginning, which is obtainable by reacting a butadiene/acrylonitrile copolymer with an epoxy resin and, being water-thinnable on protonation, produces dispersions in water which can be used as additives to standard electrocoating baths.

A suitable component (A) is a butadiene/acrylonitrile copolymer having an acrylonitrile content of 5 to 45% by weight, preferably from 10 to 30% by weight, and a butadiene content of from 55 to 95% by weight, preferably from 70 to 90% by weight, which contains on average 1.4–3.0 primary and/or secondary amino groups per molecule and may also contain tertiary amino groups. The average molecular weight ($\overline{M}n$) of the copolymer is advantageously 500–15,000, preferably 2,000–8,000.

The amino-containing copolymer can be obtained for example by reacting a carboxyl-containing butadiene/acrylonitrile copolymer with a diamine. Such aminocontaining butadiene/acrylonitrile copolymers are mostly commercially available.

Furthermore, amino-containing butadiene/acrylonitrile copolymers can be prepared by partial hydrogenation of butadiene/acrylonitrile copolymers or by addition of primary amines to epoxy-containing butadiene/acrylonitrile copolymers.

A suitable component (B) is an epoxy compound which has a molecular weight (in the case of polymers: $\overline{M}n$) of 140 to 10,000 and contains on average from 1.5 to 3 epoxy groups, preferably 2 epoxy groups, per molecule.

Preferred epoxy compounds are glycidyl ethers of aliphatic diols such as butanediol or hexanediol or glycidyl ethers of polyphenols which contain on average two or more phenolic hydroxyl groups and are preparable in a conventional manner by etherification with an epihalohydrin in the presence of alkali. Examples of suitable phenol compounds are 2,2-bis(4-hydroxyphenyl)propane (bisphenol A), 4,4'-dihydroxybenzophenone, 4,4'-dihydroxydiphenyl sulfone, 1,1-bis(4-hydroxyphenyl)ethane, 1,1-bis(4-hydroxyphenyl)isobutane, 2,2-bis(4-hydroxy-tert-butylphenyl)propane, bis(2-hydroxynaphthyl)methane and 1,5-dihydroxynaphthalene.

It is desirable in some cases to use aromatic epoxy resins having a higher molecular weight. They can be obtained by reacting the abovementioned diglycidyl ethers with a polyphenol, for example 2,2-bis(4-hydroxyphenyl)propane, and then further reacting the resulting product with epichlorohydrin to prepare polyglycidyl ethers.

It is also possible to use diglycidyl ethers of polyols of the type obtainable for example by polymerization of ethylene oxide, propylene oxide, tetrahydrofuran or other cyclic ethers.

The amounts of components (A) and (B) are in general determined in such a way that from 1.05 to 20 moles, preferably from 1.2 to 4.0 moles, of NH groups of the amino-containing butadiene-acrylonitrile copolymer (A) are used per mole of epoxy groups of component (B).

The reaction is in general carried out by reacting the butadiene/acrylonitrile copolymer (A) with the epoxy resin (B) in an organic solvent or solvent mixture which is inert not only toward amino groups but also toward epoxy groups, at 20°–150° C., preferably 50°–110° C. The reaction time can be up to 20 hours.

The polymeric reaction product thus obtained has an amine number of 25–170 mg of KOH/g of solid substance, preferably 40–100 mg of KOH/g of solid substance.

After the epoxy-amine reaction has ended, the amino groups can be wholly or partly neutralized with an acid and the protonated resin dispersed by the addition of water. A suitable acid is phosphoric acid, but it is preferable to use an organic acid such as formic acid, acetic acid, propionic acid or lactic acid. It is also possible to add the resin to a water/acid mixture. Thereafter, the organic solvents may be distilled off.

The dispersion thus obtained can be added to standard electrocoating baths. In general, the dispersion used has a solids content of 15–20% by weight.

Such electrocoating baths are based on basic polymers where the basic groups are primary, secondary or tertiary amino groups. It is also possible to use base resins which carry phosphonium or sulfonium groups.

In general, these base resins additionally contain functional groups, for example hydroxyl groups or unsaturated double bonds.

Suitable base resins of this type, the molecular weight of which is preferably within the range from 2,000 to 200,000, are polymers, for example aminoacrylate and aminomethacrylate resins, polyadducts such as aminopolyurethane resins and polycondensates such as aminoepoxy resins.

Basecoats having good corrosion protection properties are preferably prepared with aminoepoxy resins as base resins. Aminoepoxy resins are described for example in EP-A-134 983, EP-A-165 556, EP-A-167 029, DE-A-3 422 457 and DE-A-3 444 410.

They are obtained in a conventional manner by reacting epoxy-containing resins with saturated and/or unsaturated primary and/or secondary amines or aminoalcohols. Suitable epoxy resins are compounds which on average contain from 1.5 to 3, preferably 2, epoxy groups per molecule and have average molecular weights of 300 to 6,000. It is particularly advantageous to use glycidyl ethers of polyphenols which on average contain 2 hydroxyl groups in the molecule, a particularly suitable phenol component being 2,2-bis(4-hydroxyphenyl)propane (bisphenol A).

Epoxy resins having a higher molecular weight are obtained by reacting the abovementioned diglycidyl ethers with a polyphenol such as 2,2-bis(4-hydroxyphenyl)propane and further reacting the resulting products with epichlorohydrin to give polyglycidyl ethers.

The aminoepoxy resins can also be modified with saturated or unsaturated polycarboxylic acids, for example adipic acid, fumaric acid or dimeric fatty acid.

It is also possible to use base resins which have been reacted in addition with half-blocked isocyanates and have self-crosslinking properties. Such resins are described for example in EP-A-273 247 and US 4 692 503.

If the base resin does not contain any selfcrosslinking groups, it is necessary to add a crosslinking agent before preparing the dispersion.

Suitable crosslinking agents for these base resins are for example urea condensation products as described in DE-A-3 311 514 or phenolic Mannich bases as described in DE-A-3 422 457. EP-A-134 983 also mentions as further possible crosslinking agents blocked isocyanates or aminoplast resins such as urea formaldehyde resins, melamine resins or benzoguanamine resins.

The standard electrocoating baths may also contain pigment pastes and customary auxiliaries. Pigment pastes are obtainable for example from a millbase resin and pigments such as titanium dioxide, carbon black or aluminum silicates and also auxiliaries and dispersants. Suitable millbase resins are described for example in EP-A-107 089 and EP-A-251 772.

Deposition of the paint films in cathodic electrocoating customarily takes place at 20°–35° C., preferably 26°–32° C., in the course of 5–500 seconds, preferably 60–300 seconds, at deposition voltages of 50–500 V. The object to be coated is connected as the cathode.

The paint films can then be baked at 120°–210° C., preferably 140°–180° C.

This produces coatings which combine good corrosion protection properties with a high elasticity.

EXAMPLES 1 TO 7

Preparation of polymeric reaction products according to the present invention

General method

In all the Examples, the butadiene/acrylonitrile component used was a copolymer having an average molecular weight Mn of 3500–3800, obtainable by reacting aminoethylpiperazine with carboxyl-terminated butadiene/acrylonitrile copolymers having an acrylonitrile content of 16% by weight.

In Examples 1 to 5, the epoxy resin used was a polytetrahydrofuran diglycidyl ether having an epoxy equivalent weight (EEW) of approximately 840. In Example 6, a polypropylene oxide diglycidyl ether (EW $\approx$ 330) was used. In Example 7, a bisphenol-A diglycidyl ether (EEW $\approx$ 188) was used.

The butadiene/acrylonitrile copolymer was dissolved in toluene, admixed with the epoxy resin and stirred at 80° C. for several hours (see Table I) until the epoxy value was virtually zero. Thereafter, the reaction mixture was diluted with ethylene glycol monobutyl ether and isobutanol and cooled down to 40° C. Glacial acetic acid was then added, followed by deionized water in the course of an hour.

Thereafter, some of the organic solvents and water was distilled off under reduced pressure, and the solids content was then set with deionized water.

The details of these experiments are given in Table I.

TABLE I

| Example | 1 | 2 | 3 | 4 | 5 | 6 | 7 |
| --- | --- | --- | --- | --- | --- | --- | --- |
| Bu/AN copolymer [g] | 359.8 | 359.8 | 359.8 | 359.8 | 359.8 | 172.9 | 359.8 |
| Epoxy resin [g] | 23.1 | 46.3 | 52.9 | 61.7 | 70.7 | 27.4 | 9.2 |
| Toluene [g] | 164.1 | 174.0 | 176.9 | 180.6 | 184.5 | 85.8 | 158.1 |
| Ethylene glycol monobutyl ether [g] | 62.9 | 68.4 | 68.2 | 62.4 | 59.4 | 41.4 | 86.0 |
| Isobutanol [g] | 97.1 | 116.0 | 119.0 | 112.0 | 111.0 | 73.2 | 125.3 |
| Acetic acid [g] | 5.9 | 6.4 | 6.3 | 5.8 | 5.5 | 3.8 | 5.5 |
| Water [ml] | 1463 | 1588 | 1588 | 1452 | 1452 | 960 | 2000 |
| Reaction time [h] | 12 | 10 | 10 | 10 | 11 | 10 | 19 |
| Solids content [wt. %] | 17 | 19 | 17 | 18 | 18 | 18 | 17 |
| Amine number [mg of | 65.0 | 61.2 | 60.3 | 58.4 | 57.4 | 59.8 | 59.4 |

TABLE I-continued

| Example | 1 | 2 | 3 | 4 | 5 | 6 | 7 |
|---|---|---|---|---|---|---|---|
| KOH/g of solid substance] | | | | | | | |

ELECTROCOATING BATHS a) Preparation of the base resin a1) a mixture of 5800 g of hexamethylenediamine, 7250 g of imeric fatty acid and 1400 g of linseed oil fatty acid was slowly heated to 195° C. while the water formed (540 g) was distilled off. The mixture was then cooled down to 100° C. and diluted off. The mixture was then cooled down to 100° C. and diluted with 5961 g of toluene to a soilds content of 70% by weight. The product had an amine number of 197 mg of KOH/g of substance.

a2) In a second stirred vessel, 10 equivalents of a diglycidyl ether based on bisphenol A and epichlorohydrin having an equivalent weight of 485 were dissolved in a solvent mixture of 1039 g of toluene and 1039 g of isobutanol by heating. The solution thus formed was cooled down to 60° C. and admixed with 300.4 g of methylethanolamine and 128 g of isobutanol, the temperature rising to 78° C. in the course of 5 minutes. Thereafter, 1850 g of the condensation product obtained by a1) were added, and the mixture was heated at 80° C. for 2 hours.

b) Preparation of the pigment paste

To 525.8 g of the binder obtained by a) were added 168.7 g of butylglycol, 600 g of water and 16.5 g of acetic acid. This was followed by 800 g of titanium dioxide, 11 g of carbon black and 50 g of basic lead silicate, and the mixture was ball-milled to a particle size of less than 9 lm. Thereafter, a solids content of 47% by weight was set with water.

c) Preparation of the crosslinking agent

A mixture of 1.32 kg of toluene, 0.42 kg of trimethylolpropane and 0.72 kg of bisphenol A was stirred at 60° C. until a homogeneous solution had formed. This solution was added to a hot mixture of 3.45 kg of isophorone diisocyanate, 0.86 kg of toluene and 0.0034 kg of dibutyltin dilaurate at 60° C. The mixture was maintained at 60° C. for 2 hours and then admixed with 2.0 kg of dibutylamine, the rate of addition being such that the temperature of the reaction mixture did not exceed 80° C. 1.11 kg of toluene were then added, and the mixture was maintained at 80° C. for a further hour.

d) Preparation of the electrocoating baths 700 g of the binder obtainable by a) and 300 g of crosslinking agent c) were dispersed by the addition of 19 g of acetic acid with sufficient water to form a dispersion having a solids content of 31% by weight. Organic solvents were then distilled off azeotropically, and thereafter the dispersion was adjusted with water to a solids content of 35% by weight.

The dispersion thus obtained was mixed with 775 g of the pigment paste obtainable by b) and with varying amounts of the dispersion according to the present invention and made up with water to a volume of 5000 ml.

The electrocoating baths were stirred at 30° C. for 168 hours. Cathodes comprising zinc phosphatized test panels of steel were coated with paint films in the course of 120 seconds. These paint films were then baked at 155° C. for 20 minutes.

The compositions of the baths, the coating conditions and the test results are summarized in Table II.

TABLE II

| Bath | Electro-coating dispersion [g] | Dispersion acc. to pres. inv. [g] | /No. | U [V] | LD [lm] | Erichsen scratch test [mm] | RI [Nm] | 480 h SST [mm] | CET [mm] |
|---|---|---|---|---|---|---|---|---|---|
| 1 | 1836 | — | — | 280 | 23 | 5.3 | <2.3 | 1.0 | 1.6 |
| 2 | 1653 | 403 | 1 | 280 | 23 | 7.5 | 10.1 | 0.5 | 1.1 |
| 3 | 1653 | 372 | 2 | 290 | 25 | 6.4 | 10.1 | 0.7 | 1.3 |
| 4 | 1653 | 408 | 3 | 300 | 22 | 6.9 | 13.5 | 0.7 | 1.2 |
| 5 | 1791 | 94 | 4 | 260 | 23 | 6.9 | 2.3 | 0.9 | 1.6 |
| 6 | 1745 | 187 | 4 | 250 | 20 | 6.6 | 4.5 | 1.1 | 1.1 |
| 7 | 1653 | 374 | 4 | 280 | 25 | 8.5 | >18.1 | 1.1 | 0.9 |
| 8 | 1653 | 368 | 5 | 280 | 24 | 8.4 | >18.1 | 0.7 | 0.9 |
| 9 | 1653 | 376 | 6 | 260 | 26 | 7.5 | 11.3 | 1.2 | 1.2 |
| 10 | 1653 | 415 | 7 | 280 | 20 | 8.6 | 18.1 | 1.1 | 1.2 |

U: Deposition voltage
LD: Layer thickness
RI: Reverse impact test; determined with a mandrel impact tester from Gardner in accordance with ASTM D 2794
480 h SST: 480 hours of salt spray test on untreated steel, subpenetration in mm in accordance with DIN 50021
CET: 10 cycles of cyclical exposure test in accordance with VDA 621–415, subpenetration in mm

We claim:

1. A polymeric reaction product that becomes water-thinnable on protonation with an acid and is formed from
   A. a butadiene/acrylonitrile copolymer which contains primary and/or secondary amino groups, and
   B. an epoxy compound having an average molecular weight of 140–10,000 and containing on average 1.5–3 epoxy groups per molecule,
   the amount of (A) being such that 1.05 moles or more of primary and/or secondary amino groups of component (A) are present per mole of epoxy groups of component (B).

2. A reaction product as defined in claim 1, wherein component (A) is an amino-containing butadiene/acrylonitrile copolymer which contains 5–45% by weight of acrylonitrile as copolymerized units and on average from 1.5 to 3 primary and/or secondary amino groups.

3. A reaction product as defined in claim 1, wherein the epoxy compound (component B) is a glycidyl ether of a di- or polyetherol.

4. An aqueous dispersion containing a reaction product as defined in claim 1.

5. A process for preparing a polymeric reaction product as defined in claim 1, which comprises reacting
- A. a butadiene/acrylonitrile copolymer which contains primary and/or secondary amino groups with
- B. an epoxy compound having an average molecular weight of from 140 to 10,000 and containing on average from 1.5 to 3 epoxy groups per molecule, the amount of (A) being such that 1.05 moles or more of primary and/or secondary amino groups of component (A) are present per mole of epoxy groups of component (B).

6. An electrocoating bath containing a polymeric reaction product as defined in claim 1.

7. An electrocoating bath as defined in claim 6 containing in addition a crosslinking agent and a pigment paste.

8. An electrocoating both containing an aqueous disperion as defined in claim 4.

* * * * *